United States Patent
Jayanthi

(10) Patent No.: US 9,197,484 B2
(45) Date of Patent: *Nov. 24, 2015

(54) SERVER INFRASTRUCTURE FOR DIGITAL PLAQUE DISPLAYING CERTIFICATES, ASSOCIATED DOCUMENTS AND CURRENT STATUS

(71) Applicant: Madhavi Jayanthi, Laguna Niguel, CA (US)

(72) Inventor: Madhavi Jayanthi, Laguna Niguel, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/939,144

(22) Filed: Jul. 10, 2013

(65) Prior Publication Data

US 2013/0297683 A1  Nov. 7, 2013

Related U.S. Application Data

(63) Continuation of application No. 13/371,092, filed on Feb. 10, 2012, now Pat. No. 8,489,681, which is a continuation of application No. 12/156,813, filed on Jun. 5, 2008, now Pat. No. 8,150,909.

(51) Int. Cl.
| | |
|---|---|
| *G06F 15/16* | (2006.01) |
| *H04L 29/08* | (2006.01) |
| *G06Q 20/34* | (2012.01) |
| *G07F 7/08* | (2006.01) |
| *G07F 7/10* | (2006.01) |

(52) U.S. Cl.
CPC ...... *H04L 29/08855* (2013.01); *G06Q 20/3574* (2013.01); *G07F 7/0806* (2013.01); *G07F 7/1008* (2013.01)

(58) Field of Classification Search
USPC ......... 709/203, 204, 217, 219, 223, 224, 227; 715/254, 530; 707/10; 704/270.1
See application file for complete search history.

(56) References Cited

U.S. PATENT DOCUMENTS

| | | | | |
|---|---|---|---|---|
| 7,454,698 B2* | 11/2008 | Kohda et al. | ................... | 715/254 |
| 2003/0144843 A1* | 7/2003 | Belrose | ....................... | 704/270.1 |
| 2006/0170669 A1* | 8/2006 | Walker et al. | ................. | 715/530 |
| 2007/0299850 A1* | 12/2007 | Qian | ............................... | 707/10 |
| 2008/0201420 A1* | 8/2008 | Wong et al. | ................... | 709/204 |
| 2009/0295991 A1* | 12/2009 | Stafford et al. | ............... | 709/203 |

* cited by examiner

*Primary Examiner* — Quang N Nguyen

(57) ABSTRACT

A digital plaque that can display one of several stored certificates that can also retrieve updates to a displayed certificate when needed. The digital plaque is used to display a certificate and associated information. Typically the certificate displayed is one of an award, a recognition, a score card, a picture, a transcript, a document, a sales deed, a ticket, a poster, a document cover, a book cover, a patent application, a granted patent and a graduation record. A collection of such certificates is stored in memory and displayed when selected by a user. Status information and supporting documents associated with the selected certificate can be retrieved from a remote server and portions of the retrieved information can be displayed.

18 Claims, 3 Drawing Sheets

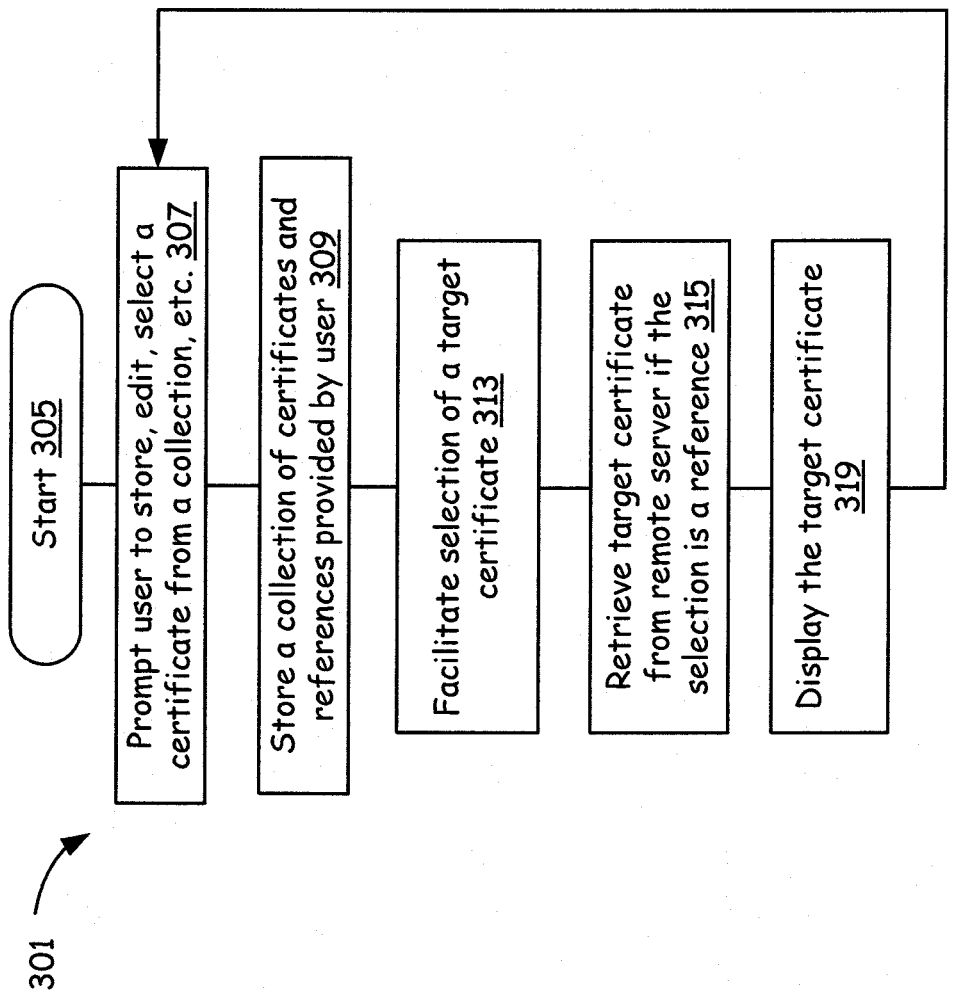

SERVER INFRASTRUCTURE FOR DIGITAL PLAQUE DISPLAYING CERTIFICATES, ASSOCIATED DOCUMENTS AND CURRENT STATUS

CROSS REFERENCES TO RELATED APPLICATIONS

The present patent application is a continuation of, claims priority to, and makes reference to U.S. non-provisional patent application Ser. No. 13/371,092, entitled "Digital plaque for displaying certificates, associated documents and current status", filed on Feb. 10, 2012, to be issued as U.S. Pat. No. 8,489,681 on Jul. 16, 2013, which in turn is a continuation of, claims priority to, and makes reference to U.S. non-provisional patent application Ser. No. 12/156,813, entitled "Digital plaque for displaying certificates, associated documents and current status", filed on Jun. 5, 2008, issued as U.S. Pat. No. 8,150,909 on Apr. 3, 2012. The complete subject matter of the above-referenced United States patent applications is hereby incorporated herein by reference, in their respective entirety.

BACKGROUND

1. Technical Field

The present invention relates generally to a plaque that is used by a user to display a certificate and particularly to a solution wherein a digital plaque makes it possible to display one of a collection of devices.

2. Related Art

Plaques are often used for employee recognition. Plaques can be ordered on the Internet and a user can select a type of frame—word, metal, plastic, etc. The user can upload a customized artwork and photos and they get engraved on the plaques ordered. Quite often, an employee hangs several plaques on the walls of his workspace. In addition, some users display the plaques on their desk at work. Quite often employees run out of space and cannot display new ones on the walls or the desks. Plaques are provided to employees of a company to commemorate an event, to appreciate work done, etc. Plaques are provided when patents are issued, and for graduation too. Quite often employees run out of space to display the plaques provided to them.

Users sometimes have information engraved on a plaque that later on becomes outdated. Users have no way to modify the plaques and they have to order new ones at considerable expense. Outdated plaques are usually discarded and new ones ordered.

Often users need to duplicate or copy the information available on a plaque. They often use a photocopier to make a copy, which usually does not look clean or clear when photocopied.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 3 is a flow chart of an exemplary operation of the digital plaque. The operation starts at a start block 305 when the user turns on the plaque.

DETAILED DESCRIPTION OF THE DRAWINGS

The present invention provides a digital plaque that can display one of several stored certificates that can also retrieve updates to a displayed certificate when needed.

Figure 1:
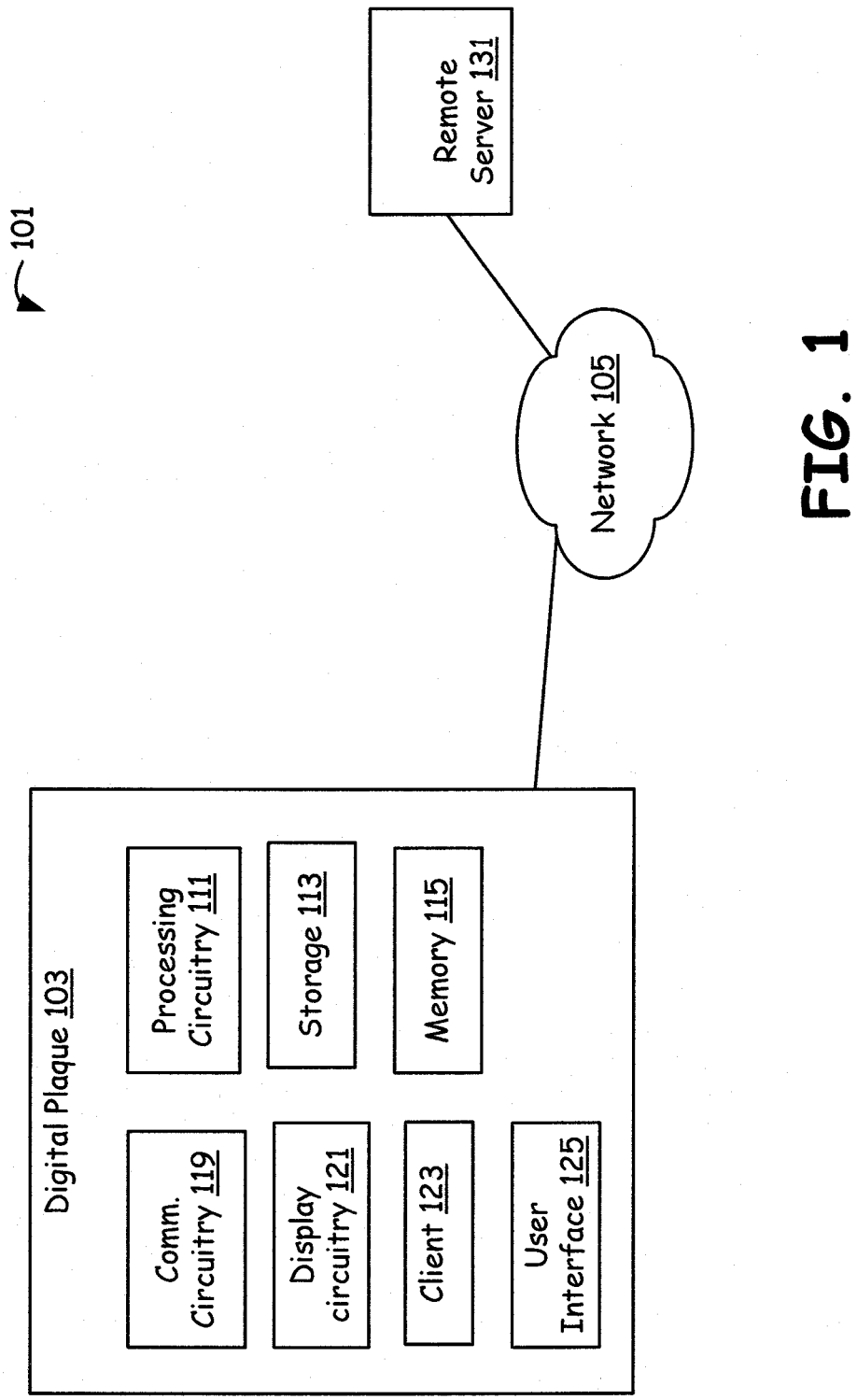
FIG. 1 is a perspective block diagram of a digital plaque that is used to display a certificate and associated information.

FIG. 1 is a perspective block diagram of a digital plaque 103 that is used to display a certificate and associated information. The digital plaque 103 comprises a memory 115, a display circuitry 121, an user interface 125, and a processing circuitry 111 that is operably coupled to the memory 115, the display circuitry 121 and the user interface 125. The memory 115 comprises executable code for causing the processing circuitry 111 to perform a certificate selection operation that results in the selection of the certificate, such as from a collection of available certificates. The memory also comprises executable code for causing the processing circuitry 111 to perform a certificate display function that results in the display of the certificate using the display circuitry.

Typically the certificate displayed is one of an award, a recognition, a score card, a picture, a transcript, a document, a sales deed, a ticket, a poster, a document cover, a book cover, a patent application, a granted patent and a graduation record. A collection of such certificates is stored in memory 115 and displayed when selected by a user.

The certificate display function is manageable using the user interface 125. A user can use buttons provided to display a certificate, select a new one for display, to update the status of a certificate, to retrieve status information from a remote server 131, etc. The certificate selection operation is manageable using the user interface 125 too, such as by the use of buttons available and touch-screen buttons displayed, such as those on a LCD touch screen.

In one embodiment, the certificate selection operation comprises accessing the remote server 131 for the certificate and its associated documents, content and status information, and retrieving them. For example, the status of a patent, such as its issue date, can be retrieved and displayed. The certificate selection operation comprises selecting one from a collection of certificates currently available in the memory 115 and selectively retrieving a current status information for that certificate from a remote server 131. Such status information and related documents can be locally stored in the memory 115 if necessary. The memory 115 is a non-volatile memory such as a flash stick (NOR, NAND, etc.), a hard disk drive, etc.

The digital plaque 103 displays one of several stored certificates and can also retrieve updates to a displayed certificate when needed. The digital plaque 103 is used to display a certificate and associated information, wherein the associated information can be related documents, a status information, etc. Typically the certificate displayed is one of an award, a recognition, a score card, a picture, a transcript, a document, a sales deed, a ticket, a poster, a document cover, a book cover, a patent application, a granted patent and a graduation record. A collection of such certificates is stored in the memory 115 and displayed when selected by a user. Status information and supporting documents associated with the selected certificate can be retrieved from a remote server 131 and portions of the retrieved information can be displayed based on user preferences and configuration.

In one embodiment, the digital plaque 103 is used to display a patent awarded to the user. Using the user interface 125 provided on the digital plaque 103, a user can retrieve a status for the patent by communicating with the remote server 131 that is capable of providing the status information for the patent. The digital plaque 103 displays the patent status, such as an issue date, an expiry date, fees due, etc. In a related embodiment, the digital plaque 103 periodically checks the status of the patent automatically without user inputs.

Figure 2:
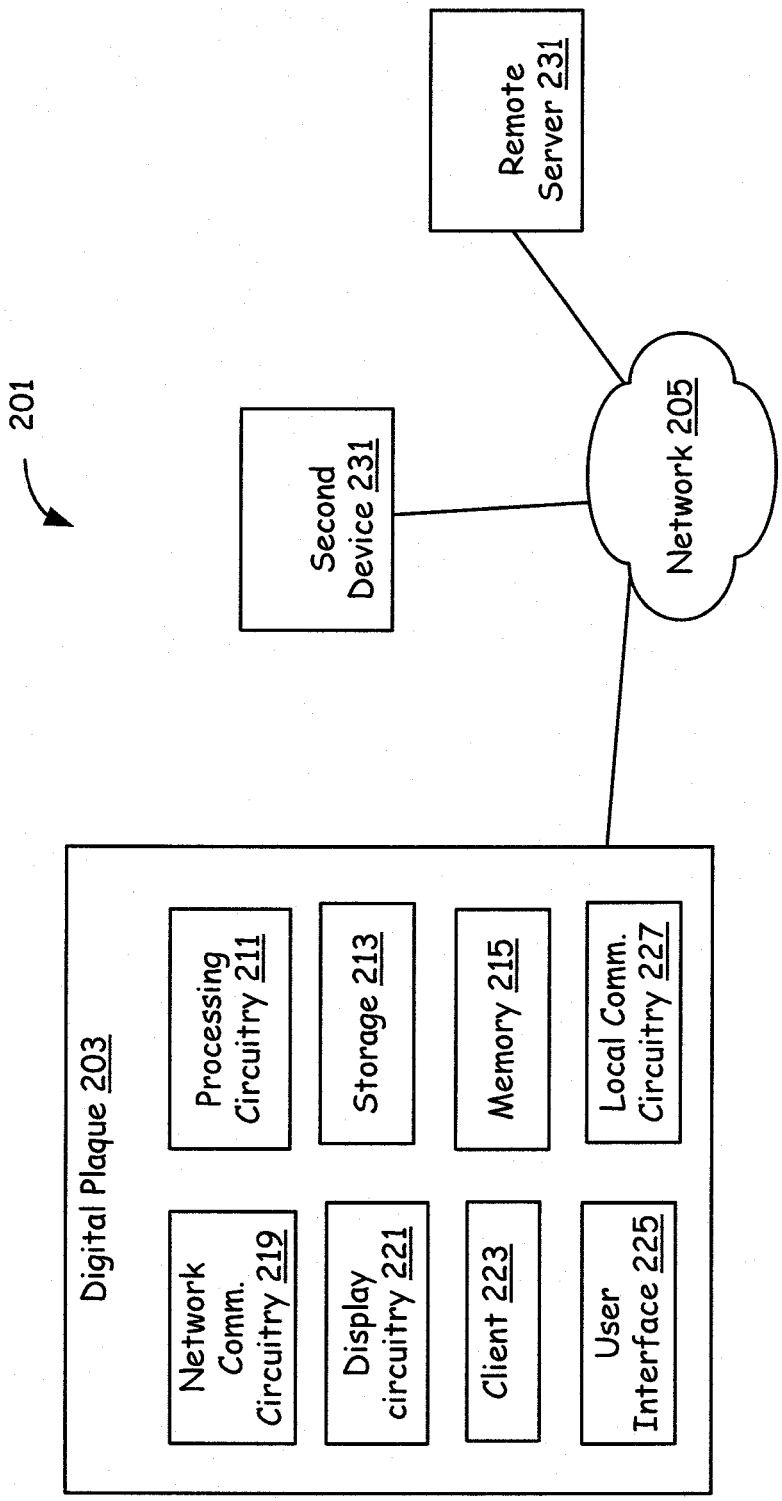
FIG. 2 is a perspective block diagram of a digital plaque capable of displaying a selected one of a collection of certificates, wherein updates and associated documents can be retrieved and portions displayed when a document is selected for display by a user from the collection of certificates.

FIG. 2 is a perspective block diagram of a digital plaque 203 capable of displaying a selected one of a collection of certificates, wherein updates and associated documents can be retrieved and portions displayed when a document is selected for display by a user from the collection of certificates. The digital plaque 203 comprises at least one non-volatile memory 215 having stored therein one or both of firmware and software (such as an audio player, a video player, a clock, a calendar, etc.). It also comprises a network communication circuitry 219, a display circuitry 221 and at least one processing circuitry 211 operably coupled to the network communication circuitry 219, the display circuitry 221 and the at least one non-volatile memory 215. The at least one processing circuitry 211, during its operation, selects a certificate from a collection of certificates that is stored in the at least one non-volatile memory 215 and displays the certificate on the display circuitry 221. It also retrieves, when triggered, an updated certificate employing the network communication circuitry 219. It displays at least one portion of the updated certificate on the display circuitry.

The digital plaque of also comprises a local communication circuitry 227, such as Bluetooth, IR, etc. The at least one processor 211 is operably coupled to the local communication circuitry 227 and manages the sharing of the at least one portion of the certificate with a second device 231 employing the local communication circuitry 227. The second device 231 is one of a printer, a personal computer, a laptop, a television, a camera and a mobile phone. A collection of certificates is locally stored in the at least one non-volatile memory 215. The at least one processing circuitry 211 facilitates selection of a target certificate by a user from the collection of certificates for display on the display circuitry 221.

The at least one processing circuitry 211 also facilitates retrieval of a status information for the target certificate from an remote server 231 when the user selects it from the collection of certificates, for display on the display circuitry, i.e. for display on a screen associated with the display circuitry.

In one embodiment, the digital plaque 203 also comprises an audio player circuitry and an audio data. The at least one processing circuitry 211 facilitates the playing of the audio data using the audio player circuitry during the display of the certificate on the display circuitry. In a related embodiment, the plaque comprises a video player circuitry and a video data. The at least one processing circuitry 211 facilitates the playing of the video data using the video player circuitry during the display of the certificate on the display circuitry 221.

In one embodiment a replaceable decorative frame that frames a screen portion of the display circuitry 221 is provided. Decorative frames can be a metallic frame with engravings, a wood frame with engraving, a plastic frame, etc.

The digital plaque 203 provides a user interface 225 that has buttons that is used to select the certificate from a collection of certificates and to manage the collection of certificates.

In a related embodiment, the display circuitry 221 provides softkeys and touch sensitive buttons on a touch sensitive screen portion of the display circuitry 221 that is used to select the certificate from a collection of certificates and to manage the collection of certificates.

FIG. 3 is a flow chart of an exemplary operation of the digital plaque. The operation starts at a start block 305 when the user turns on the plaque. Then, at a next block 307, the plaque prompts the user to store a certificate, communicate a certificate, update status, edit a stored certificate, select a certificate from a collection/list of certificates currently available. Then, at a next block 309, when the user selects a store option, the plaque facilitates storing a collection of certificates and references. Certificates or references to certificates can be stored. If a reference, such as a URL is stored, then the actual certificate and associated data/status information is retrieved for display from a remote server using the reference, when the user selects the reference.

Then, at a next block 313, when the user selects a "display certificate" option, the plaque facilitates selection of a target certificate, from the collection of certificates and references, by a user for display. Then, when the user selects a target certificate by choosing an entry from the list presented, then at a next block 315, the plaque retrieves the target certificate from a remote server employing the communication circuitry if the selection is a reference to the target certificate.

Then, at a next block 317, the plaque displays the target certificate on a display unit of the digital plaque. Then the processing loops back to the next block 305 for further user input.

Each of the certificates in the collection of certificates presented to the user at the block 313 are one of a patent, an award, a poem, a transcript, a document serving as evidence, a document serving as a written testimony, etc. In addition, is the collection has references to certificates, each of the references is one of a universal resource identifier, a document identification, a document number, a patent number, a search string and a name. When a certificate is displayed, a portion of the certificate can be shared with a second device in proximity employing a local communication circuitry. The plaque is capable of managing the sharing of portion of the certificate with the second device until the sharing is terminated by the plaque or the second device indicates termination of sharing.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present invention has been described in terms of GPS coordinates/and navigational information communication involving mobile phones and computers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A server infrastructure that supports a plurality of client devices via a communication network, the server infrastructure comprising:
    a remote server comprising:
        a search system that supports electronic searching of a first document to identify search results data, the searching being based at least in part on a first search string received from a first display device of the plurality of client devices via a communication network, and the search system also performing, when instructed, a related search of one or more update source databases to identify update data, the update data defining the updates and associated documents to the various items identified in the search results data;
        the search system delivers both the search results data and the update data to the first device of the plurality of client devices; and
        a status information system, coupled via the communication network to the plurality of client devices, that delivers both periodic updates as well as user retrieved updates to the first device of the plurality of client devices for a document currently displayed on the first device;
        wherein the server retrieves information comprising update information and status information and provides them, wherein portions of the retrieved information is displayed on the first display device of the plurality of client devices based on user preferences and configuration;
        wherein the document displayed is one of an award, a recognition, a score card, a picture, a transcript, a sales deed, a ticket, a poster, a document cover, a book cover, a paten application, a granted patent and a graduation record.

2. The infrastructure of claim 1 wherein the communication network comprises the Internet.

3. The infrastructure of claim 1, wherein at least a portion of the first search string is one of a universal resource identifier, a document identification, a document number, a patent number, a search string and a name.

4. The infrastructure of claim 1, wherein the periodic updates and user retrieved updates comprises, at least in part, one or more of an issue date, an expiry date, and fees due.

5. The infrastructure of claim 1, wherein the periodic updates as well as user retrieved updates each comprise at least one of a related document, an updated document, and a status information.

6. A method performed by a remote server, the method comprising:
    providing access for retrieval of a certificate from a collection of certificates and its associated documents to a device with a display that displays the certificate;
    receiving, from the device, one reference to the certificate and selectively retrieving the certificate, updates and status information for the certificate; and
    automatically, or based on a user input or user selection, communicating the retrieved certificate, updates and status information to the device for displaying to the user;
    wherein the remote server retrieves information comprising update information and status information and provides them, wherein portions of the retrieved information is displayed on the device of the plurality of client devices based on user preferences and configuration;
    wherein the certificate displayed is one of an award, a score card, a picture, a transcript, a sales deed, a ticket, a poster, a document cover, a book cover, a patent application, a granted patent and a graduation record;
    wherein the remote server periodically retrieves and sends the updates and status information associated with the certificate for displaying on the device.

7. The method of claim 6 wherein the certificate displayed is one of an award, a recognition, a score card, a picture, a transcript, a document, a sales deed, a ticket, a poster, a document cover, a book cover, a patent application, a granted patent and a graduation record.

8. The method of claim 6 wherein the certificate comprises associated audio data and video data, wherein the remote server makes the audio data and video data available to the device.

9. The method of claim 6 wherein providing access comprises:
    receiving, from the device, a selection criteria for the certificate, wherein the selection criteria is one of a universal resource identifier, a document identification, a document number, a patent number, a search string and a name.

10. The method of claim 6 wherein the remote server is coupled via a communication network to a plurality of client devices and delivers both a corresponding search certificate and also associated documents and updates to each of the plurality of client devices based on a corresponding reference to a certificate that it receives from the associated ones of the plurality of client devices.

11. A server infrastructure that supports a plurality of client devices capable of displaying documents via a communication network, the server infrastructure comprising:
    a retrieval system configured to perform a first electronic search to identify search results data, the first electronic search being based at least in part on a first document retrieval instruction received from a first device of the plurality of client devices via the communication network, wherein the search results data comprises certificate or references to certificates, associated documents, content and status information, for display;

a user interfacing system, coupled via the communication network to the plurality of client devices, that is configured to deliver the search results data to the first device of the plurality of client devices;

the retrieval system provides a first certificate for display to a user based on a first document identification, universal resource locator or a reference provided for the first document;

the retrieval system also performs a second electronic search to identify an update results data, the second electronic search being based at least in part on the first document identification received from the first device of the plurality of client devices, wherein the update results data comprises documents, content and status information associated with the first document identification;

the retrieval system periodically retrieves and sends the update results data to the first device of the plurality of client devices; and the user interfacing system also delivers the update results data to the first device of the plurality of client devices;

wherein the server infrastructure retrieves information comprising update information and status information and provides them, wherein portions of the retrieved information is displayed on the first display device of the plurality of client devices based on user preferences and configuration;

wherein the first document displayed in one of an award, a score card, a picture, a transcript, a sales deed, a ticket, a poster, a document cover, a book cover, a patent application, a granted patent and a graduation record.

12. The server infrastructure of claim 11 wherein the first document identification is associated with a user selected certificate among the certificates delivered to the first device of the plurality of client devices.

13. The server infrastructure of claim 11 further comprising:
the user interfacing system configured to deliver both the certificates as well as update results data for all the certificates to the first device in response to the first document retrieval instruction.

14. The server infrastructure of claim 11 wherein the update results data comprise associated audio data and video data, wherein the server provides the audio data and video data to the first device.

15. The server infrastructure of claim 11 wherein the search results data comprise multiple items and wherein each of the items in the search results data is one of an award, a poem, a transcript, a document serving as evidence, a document serving as a written testimony, a recognition, a score card, a picture, a transcript, a document, a sales deed, a ticket, a poster, a document cover, a book cover, a patent application, a granted patent and a graduation record.

16. The server infrastructure of claim 11 wherein the first document retrieval instruction identifies a user, the search results data comprises a graduation certificate for the user that is displayed for the user, the first document identification identifies the graduation certificate for the user and the update results data comprises updates associated with the graduation certificate for the user, coursework details, and a transcript for the user.

17. The server infrastructure of claim 11 wherein the second electronic search is conducted when requested by a user.

18. The server infrastructure of claim 11 further comprising:
the retrieval system responds to a selection of a first category of documents received by one of the plurality of client devices by delivering a first certificate, a first URL, and a first audio data and video data related to the first certificate; and
the user interfacing system that responds to the one of the plurality of client devices via the first URL to deliver a content to the one of the plurality of client devices, the content relating to the first certificate.

* * * * *